United States Patent Office 3,682,839
Patented Aug. 8, 1972

3,682,839
ELECTRICAL RESISTANCE ELEMENTS
Robert L. Galloway, Durham, England, assignor to Morganite Resistors Limited, Jarrow, Durham County, England
No Drawing. Filed Nov. 26, 1969, Ser. No. 880,352
Int. Cl. H01b 1/06; C04b 35/52; F24b 1/10
U.S. Cl. 252—508                                 9 Claims

ABSTRACT OF THE DISCLOSURE

An electrical resistance element consists of a refractory conglomerate of particles of a material, e.g. carbon, of low electrical resistivity and a material, e.g. calcined clay or alumina, of high electrical resistivity and a basic binder, e.g. ball clay or bentonite, processed to form an open cellular structure so that the element is permeable by a fluid, the structure having either or both of the following characteristics:

(a) the apparent porosity of the element is not less than 25%;
(b) between two surfaces the permeability of the element is such as to give a flow rate of not less than 0.1 ml. (millilitre) of water per second through a 1 cm. cube of the element material, under a pressure of 50 mm. mercury at a temperature of 20° C.

---

This invention relates to electrical resistance elements, of the kind which are permeable to fluids so that fluid can be caused to percolate in the element and thereby abstract heat caused by electric current flow.

Difficulty has been found in providing elements with both a required degree of fluid permeability and suitable electrical resistivity.

Available materials which have the required fluid permeability have either a very low electrical resistivity, such as porous carbon, or a very high electrical resistivity, such as sintered alumina, and consequently they involve the use of electrical supply at special voltages or transformers to utilise mains supply.

The present invention is based on the realisation that electrical resistance materials, such as clay-carbon materials, which can be produced to meet given resistivity requirements, particularly for mains supply voltages, could be utilised for fluid-permeable electrical resistance heaters if they could be made to given permeability requirements.

In the past production of clay-carbon and similar electrical resistance elements, it has been usual to avoid or reduce porosity of the material by vitrification of the material or even low porosity materials have been enamelled or otherwise coated to prevent penetration of moisture.

By contrast, the present invention involves the deliberate production of an element of relatively high porosity and consequent fluid permeability.

According to the invention, a fluid-permeable electrical resistance element consists of a refractory conglomerate of particles of at least two materials, respectively of relatively high and low electrical resistivity, forming an open cellular structure so that the element is permeable by fluid and has either or both of the following characteristics:

(a) the apparent porosity of the element is not less than 25%;
(b) between two surfaces the permeability of the element is such as to give a flow rate of not less than 0.1 ml. (millilitre) of water per second through a 1 cm. cube of the element material, under a pressure of 50 mm. mercury at a temperature of 20° C.

An element in accordance with the invention may be used for heating fluids passing through it and may be made largely by techniques known for making clay-carbon and similar electrical resistors except that care must be taken to avoid such vitrification of the material that its permeability is impaired.

In general, care should be taken to avoid the use of constituents, particularly binders, which vitrify on heating, a substantial proportion of relatively large particles of the basic refractory material should be included and only moderate pressures and a temporary binder, i.e., volatile or combustible, should be used in forming the element to shape before firing.

Good results can be achieved with clay-carbon conglomerates having the following general composition, by weight of starting materials, the proportions being varied to suit the electrical and fluid permeability requirements.

High resistivity material:                                    Percent
    Particles of refractory material such as calcined clay or alumina _____ 40–90
Low resistivity material:
    Carbon _____ 0.5–40
Basic binder:
    Clay, such as ball clay and/or bentonite ____ 3–50

The materials are thoroughly mixed, with or without water according to the kind of element to be made, formed to shape, such as by dry-pressing, moulding or extrusion and then fired, for example to 1200° C.–1400° C., in a non-oxidising or reducing atomsphere. The particles to be pressed should have a size within the range 50 to 2000 microns.

In the case of dry-pressing, a temporary binder, such as 3% w.w. ethylene glycol, may be used and pressure should be of the order of 0.5 ton/in².

One or more surfaces of an element may be coated or sheathed, particularly for the purpose of thermal insulation.

A thermal insulating sheath or layer may be formed on an element, such as on the outside of a cylindrical element, by a layer consisting of the same materials as the body of the element but in different proportions, the high resistivity refractory particles being predominant, for example:

Percent
Refractory _____ 80–89
Clay _____ 10–20
Carbon _____ 0–2.5

EXAMPLE

A sheathed electrical resistance element, suitable for a water heater operable at 250 V and having a power output of about 2½ kilowatts, consists of a hollow cylinder 6.6 cm. long, 3.05 cm. outside diameter and 1.15 cm. bore diameter, the thermal insulating sheath on the external surface being 0.35 cm. thick, and the element has a resistance of 20 ohms.

The element is produced from a mix comprising in parts by weight:

Percent
Ceramic filler comprising equal parts by weight of calcined alumina and calcined fireclay _____ 64
Clay binder comprising equal parts of ball clay and bentonite _____ 30
Carbon _____ 6

The materials are mixed in a conventional mixer with 3% w.w. ethylene glycol and the mixed material has particles distributed in the range 350–850 microns.

The sheath material has a composition in parts by weight:

| | Percent |
|---|---|
| Ceramic filler as above | 84 |
| Clay binder as above | 14.8 |
| Carbon | 1.4 |

The mix is pressed to shape at about 0.78 kg./mm.² and the shapes so produced are fired at between 1200° C. and 1400° C. being packed in loose carbon material in saggars.

The element has a fired density of 1.98 gms./cm.³ which corresponds to an unfired density of 2.1 gm./cm.³.

The ends of the cylindrical element are nickel sprayed to obtain good electrical contact.

I claim:

1. A fluid-permeable electrical resistance element consisting of a refractory conglomerate of particles of at least two materials, one of said materials being carbon having a first and low electrical resistivity, and the second of which materials is a refractory selected from the group consisting of calcined clay and alumina and has a second electrical resistivity substantially greater than that of carbon, said refractory conglomerate having an open cellular structure so that the element is permeable by fluid and has the following characteristic: between two surfaces the permeability of the element is such as to give a flow rate of not less than 0.1 ml. (millilitre) of water per second through a 1 cm. cube of the element material, under a pressure of 50 mm. mercury at a temperature of 20° C.

2. A fluid-permeable electrical resistance element according to claim 1, the element being produced from a composition comprising in proportions by weight:

| | Percent |
|---|---|
| High resistivity material: | |
| Particles of refractory material such as calcined clay or alumina | 40–90 |
| Low resistivity material: | |
| Carbon | 0.5–40 |
| Basic binder: | |
| Clay, such as ball clay and/or bentonite | 3–50 |

3. A fluid-permeable electrical resistance element according to claim 1, the element having thermally insulated surfaces.

4. A fluid-permeable electrical resistance heater element according to claim 3, the thermal insulation being by a sheath consisting of a low resistivity material and a high resistivity material in which the latter predominates.

5. A fluid-permeable electrical resistance element according to claim 4, the sheath being of a composition in parts by weight comprising:

| | Percent |
|---|---|
| Refractory | 80–89 |
| Clay | 10–20 |
| Carbon | 0–2.5 |

6. A method of producing an electrical resistance element according to claim 1, wherein particles of a low resistivity material, a basic refractory material and a basic clay binder are thoroughly mixed together, the mix is formed to shape and the shape is fired at between 1200° C. and 1400° C. in a non-oxidising or reducing atmosphere.

7. A method according to claim 6, wherein the mix additionally comprises water.

8. A method according to claim 6, wherein the mix also contains a volatile or combustible binder and is dry pressed.

9. A method according to claim 8, wherein pressing is carried out at a moderate pressure.

References Cited

UNITED STATES PATENTS

| 1,289,578 | 12/1918 | Tone | 106—56 |
| 1,678,676 | 7/1928 | Lewis | 106—41 |
| 3,177,161 | 4/1965 | Smith-Johannsen | 252—518 |

DOUGLAS J. DRUMMOND, Primary Examiner

U.S. Cl. X.R.

106—56, 40; 219—338, 307; 252—509; 338—334